United States Patent [19]

Getson, Jr. et al.

[11] Patent Number: 5,081,609
[45] Date of Patent: Jan. 14, 1992

[54] MULTIPROCESSOR CONTROLLER HAVING TIME SHARED CONTROL STORE

[75] Inventors: Edward F. Getson, Jr.; John W. Bradley, both of Peabody, Mass.; Joseph P. Gardner, Merrimack, N.H.; Alfred F. Votolato, Johnston, R.I.

[73] Assignee: Bull HN Information Systems Inc., Billerica, Mass.

[21] Appl. No.: 295,629

[22] Filed: Jan. 10, 1989

[51] Int. Cl.⁵ ............................................. G06F 9/445
[52] U.S. Cl. ............................ 395/425; 364/959; 364/960.4; 364/967.1; 364/968
[58] Field of Search ... 364/200 MS File, 900 MS File

[56] References Cited

U.S. PATENT DOCUMENTS

| | | | |
|---|---|---|---|
| 3,500,466 | 3/1970 | Carleton | 340/172.5 |
| 3,651,482 | 3/1972 | Benson et al. | 340/172.5 |
| 3,909,799 | 9/1975 | Recks et al. | 340/172.5 |
| 3,969,702 | 7/1976 | Tessera | 364/200 |
| 4,008,462 | 2/1977 | Karda | 364/200 |
| 4,028,668 | 6/1977 | Riikonen | 364/200 |
| 4,050,097 | 9/1977 | Miu | 364/200 |
| 4,062,058 | 12/1977 | Haynes | 364/200 |
| 4,084,229 | 4/1978 | Taylor et al. | 364/200 |
| 4,085,450 | 4/1978 | Tulpule | 364/900 |
| 4,124,888 | 11/1978 | Washburn | 364/200 |
| 4,152,763 | 5/1979 | Shimoi | 364/200 |
| 4,156,925 | 5/1979 | Tutt | 364/200 |
| 4,246,637 | 1/1981 | Brown et al. | 364/200 |
| 4,296,464 | 10/1981 | Woods et al. | 364/200 |
| 4,321,665 | 3/1982 | Shen et al. | 364/200 |
| 4,322,792 | 3/1982 | Baun | 364/200 |
| 4,323,967 | 4/1982 | Peters et al. | 364/200 |
| 4,327,408 | 4/1982 | Frissell | 364/200 |
| 4,348,723 | 9/1982 | Woods | 364/200 |
| 4,365,311 | 12/1982 | Fukunaga | 364/900 |
| 4,371,932 | 2/1983 | Dinwiddie et al. | 364/200 |
| 4,384,285 | 5/1983 | Long et al. | 340/723 |
| 4,488,231 | 12/1984 | Yu et al. | 364/200 |
| 4,695,943 | 9/1987 | Keeley et al. | 364/200 |
| 4,754,396 | 6/1988 | Horst | 364/200 |
| 4,800,523 | 1/1989 | Gerety et al. | 364/900 |
| 4,821,170 | 4/1989 | Bernick | 364/200 |
| 4,890,218 | 12/1989 | Bram | 364/200 |
| 4,890,225 | 12/1989 | Ellis | 364/200 |

OTHER PUBLICATIONS

Hotley et al.; Dual Microprocessor Control System; 46 pages of Specification, 8 Sheets of Formal Drawings, FIGS. 1-9.

Primary Examiner—Thomas C. Lee
Assistant Examiner—Eric Coleman
Attorney, Agent, or Firm—Faith F. Driscoll; John S. Solakian; James M. Smith

[57] ABSTRACT

A controller connected between a system bus and peripheral devices has at least two microprocessors. One controls the data transfers with the peripheral devices, and the other controls data transfers with the system bus. The microprocessors share a data buffer and control store. This sharing is possible because of the controller timing means which synchronizes exclusive access to the shared components of the controller. When first initialized, the microprocessors are directed to execute a test instruction which points them to the beginning of their set of microinstructions. Once pointed to their set of microinstructions, normal operation may begin.

14 Claims, 9 Drawing Sheets

SHT 1 OF 2

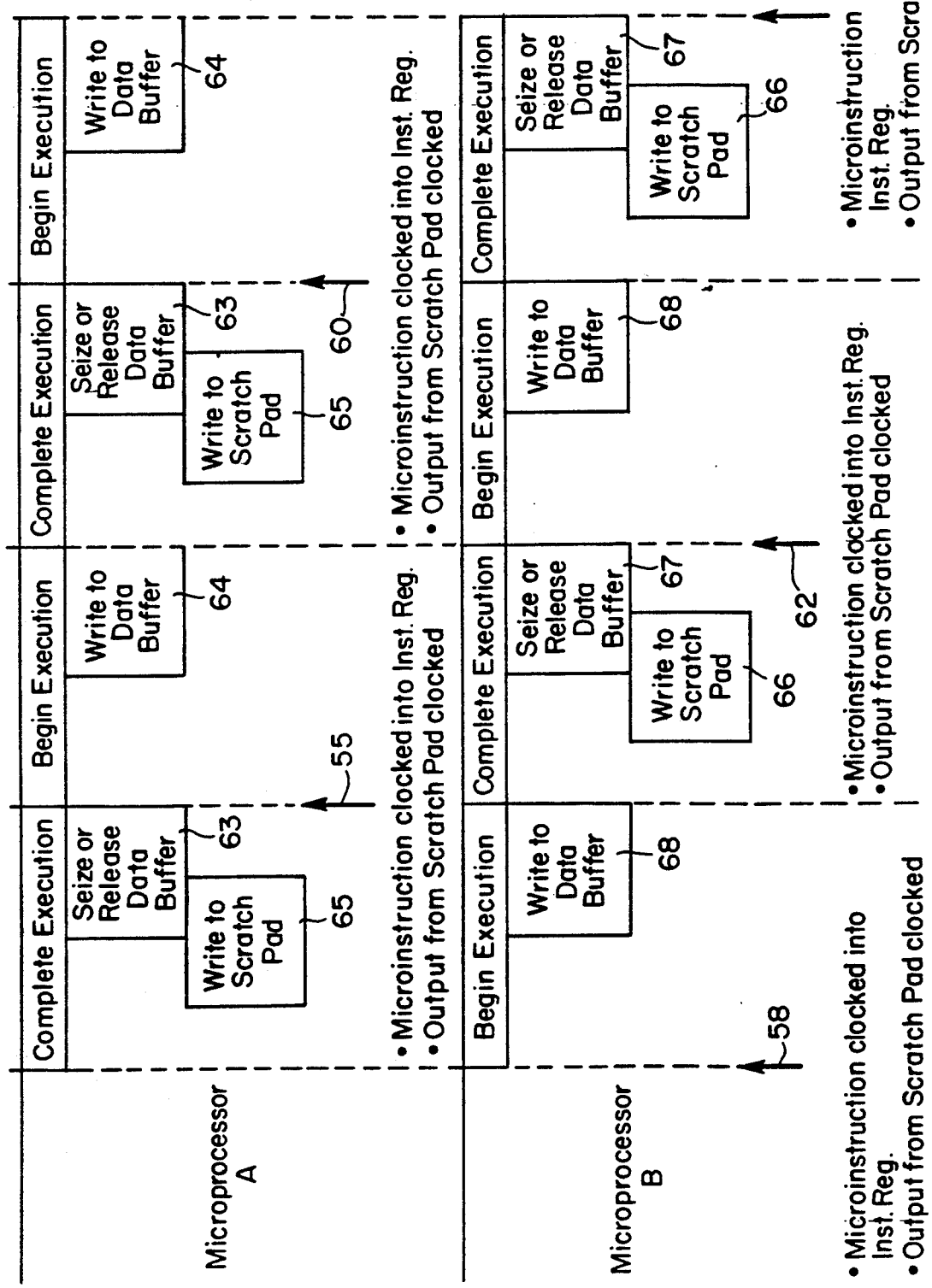

MULTIPROCESSOR CONTROLLER HAVING TIME SHARED CONTROL STORE

CROSS-REFERENCE TO RELATED APPLICATIONS

The following patent applications which are assigned to the same assignee as the instant application have been filed on the same date as the instant application, and they contain related subject matter.

| Title | Inventors | Ser. No. |
| --- | --- | --- |
| Peripheral Controller With Paged Data Buffer Management | Edward F. Getson, Jr. John W. Bradley & Joseph P. Gardner Alfred F. Votolato | 07/295,335 Now Patent No. 4888727 |
| Controller Having An EEPROM Firmware Store | Edward F. Getson, Jr., John W. Bradley & Joseph P. Gardner Alfred F. Votolato | 07/295,318 |
| Method and Apparatus for Limiting the Utilization of An Asynchronous Bus With Distributed Controlled Access | George J. Barlow John W. Bradley & Edward F. Getson, Jr. | 07/295,639 |

BACKGROUND OF THE INVENTION

FIELD OF USE

The present invention relates generally to data processing systems. More specifically, the present invention relates to peripheral controllers for controlling data transfers between data processing systems and peripheral devices.

PRIOR ART

Most modern data processing systems perform both input and output operations such as reading from a keyboard or sending data to a line printer. For purposes of efficiency and division of labor, input and output operations to peripherals in such data processing systems are usually controlled by peripheral controllers. The general scheme is that these controllers act as intermediaries between the system bus and the peripheral devices.

Peripheral device controllers have been increasingly required to simultaneously handle I/O transactions from a large number of different peripheral devices. Each of these peripheral devices may have significantly different operating characteristics. Hence, in order to enable the controllers to handle the differing operating characteristics of the large number of peripheral devices, peripheral device controllers now employ microprocessors with microprograms tailored to the requirements of the different devices.

SUMMARY OF THE INVENTION

In a preferred embodiment of the present invention a peripheral controller has at least one data buffer for temporarily storing data transfers between a system bus and peripheral devices. It also has two microprocessors. The first microprocessor controls data transfers between the system bus and the data buffer, whereas the second microprocessor controls the data transfers between the data buffer and the peripheral devices. In addition, a common control store is connected to the two microprocessors. The control store contains first and second sequences of microinstructions which control operation of the two microprocessors.

A test microinstruction is stored in the control store in the preferred embodiment. This test instruction directs each of the microprocessors to the beginning of its sequence of microinstructions when the system is powered up.

The controller has clooking circuitry which generates a clock signal divided into cycles. This clock signal is used in controlling operation of the microprocessors. Each microprocessor is assigned a portion of a oycle during which it may exclusively access the control store. In the preferred embodiment, the clocking circuitry also controls the microprocessor's access to a scratoh pad memory which is used for interprocessor communication. The clocking circuitry also plays a role in controlling seizure of the data buffer in the preferred embodiment. Each microprocessor is assigned a portion of a cycle in which it may exclusively access the scratch pad memory and a portion in which it may seize the data buffer. The portions may or may not be the same portion assigned to that microprocessor for accressing the control store.

BRIEF DESCRIPTION OF THE DRAWINGS

The foregoing and other objects, features and advantages of the invention will be apparent from the following more particular description of the invention, as illustrated in the accompanying drawings in which like reference numerals refer to the same elements.

DETAILED DESCRIPTION OF THE PREFERRED EMBODIMENT

Figure 1:
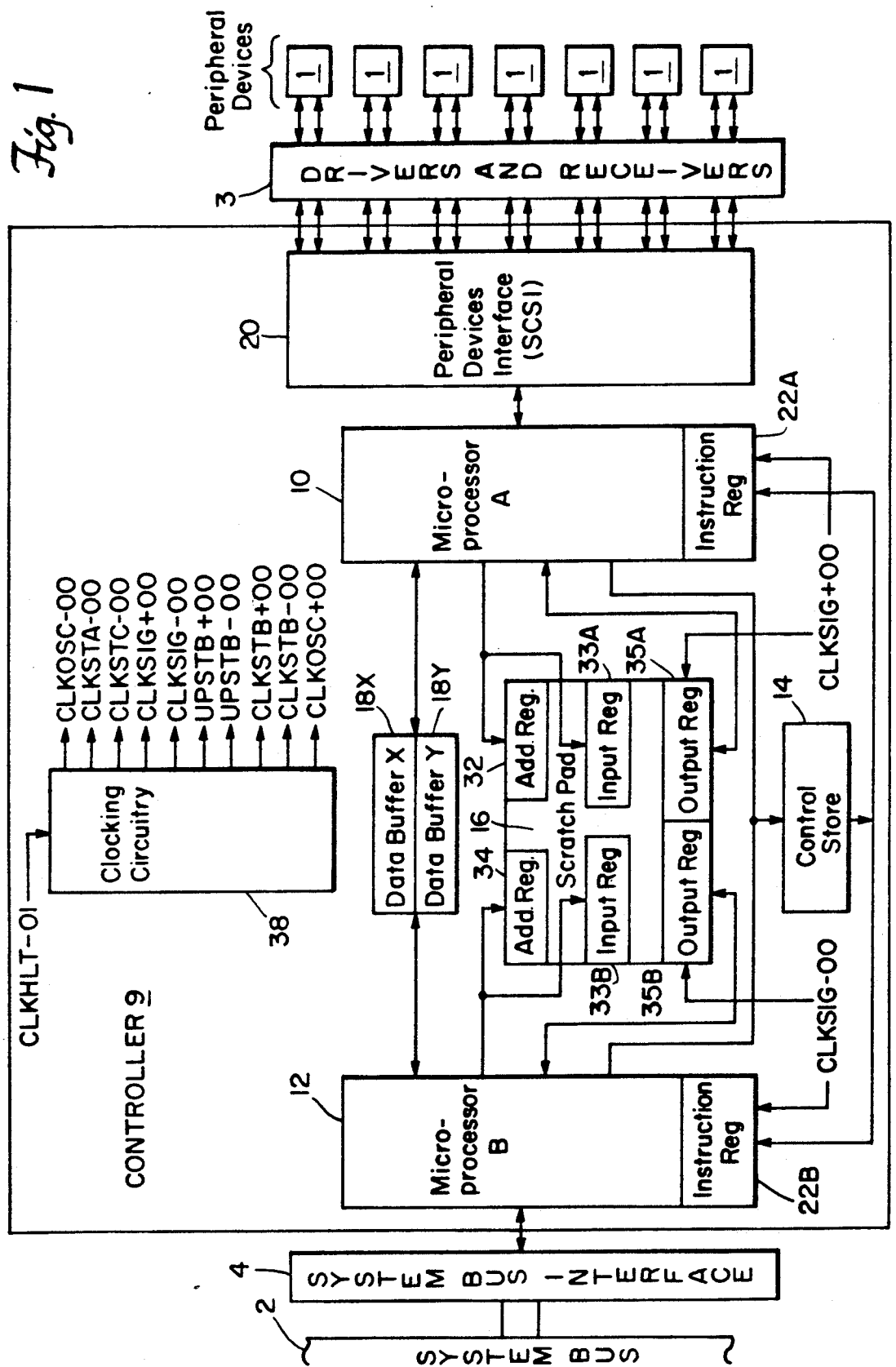
FIG. 1 is a block diagram of the controller.

In the preferred embodiment of the invention illustrated in FIG. 1, a controller 9 controls the data transfers between the system bus 2 and the peripheral devices !. The controller 9 can control data transfers from a multitude of different types of peripheral devices ! and is designed to control up to sixteen data channels. Two of the channels are not used by peripherals, thus, the controller can simultaneously control up to fourteen peripheral devices.

The basic elements of the controller include two microprocessors 10 and 12. They are oonnected to allow communication with each other and to allow sharing of a control store 14. The control store 14 is comprised of a Random Access Memory (RAM) such as the Hitachi 6789. They also are connected to allow sharing of a scratch pad memory 16 as well as to allow sharing of data buffers 18X and 18Y. In the preferred embodiment, the scratch pad memory 16 is comprised of RAMs such as the Hitachi 6789 and the 6267P-45. and the data buffer is a RAM such as the Hitachi 6287. Microprocessor 12, designated as microprocessor B, controls data transfers between the system bus 2 and the data buffer 18X and 18Y, whereas microprocessor 10, designated as microprocessor A, controls data transfers between the data buffer 18X and 18Y and the peripheral devices 1. The operation of these microprocessors 10 and 12 is governed by the clocking circuitry 38. The details of the clocking circuitry 38 will be discussed below.

The controller is adaptable to different system buses and different peripheral devices. To adapt to a change in system buses or peripheral devices, new firmware must be loaded into the control store 14. Interfaced between microprocessor B and the peripheral devices 1 is a peripheral devices interface 20 which meets the Small Computer System Interface (SCSI) specification, (ANSI SPEC. X3.131). In the preferred embodiment, this interface 20 is a Western Digital 3392 SCSI controller chip. The peripheral devices interface 20 performs command, message, data, and status transfer functions. Connected to the peripheral devices interface 20 are a series of drivers and receivers 3 which send and receive information to and from the peripheral devices 1. An interface 4 is also provided to interface the system bus 3 with the controller. The interface 4 is more fully described in the above-mentioned Barlow et al. application.

The present invention need not be limited to two microprocessors. More than two may be used, but there must be at least two. Use of more than two microprocessors would, however, require altering the synchronization method.

Figure 2:
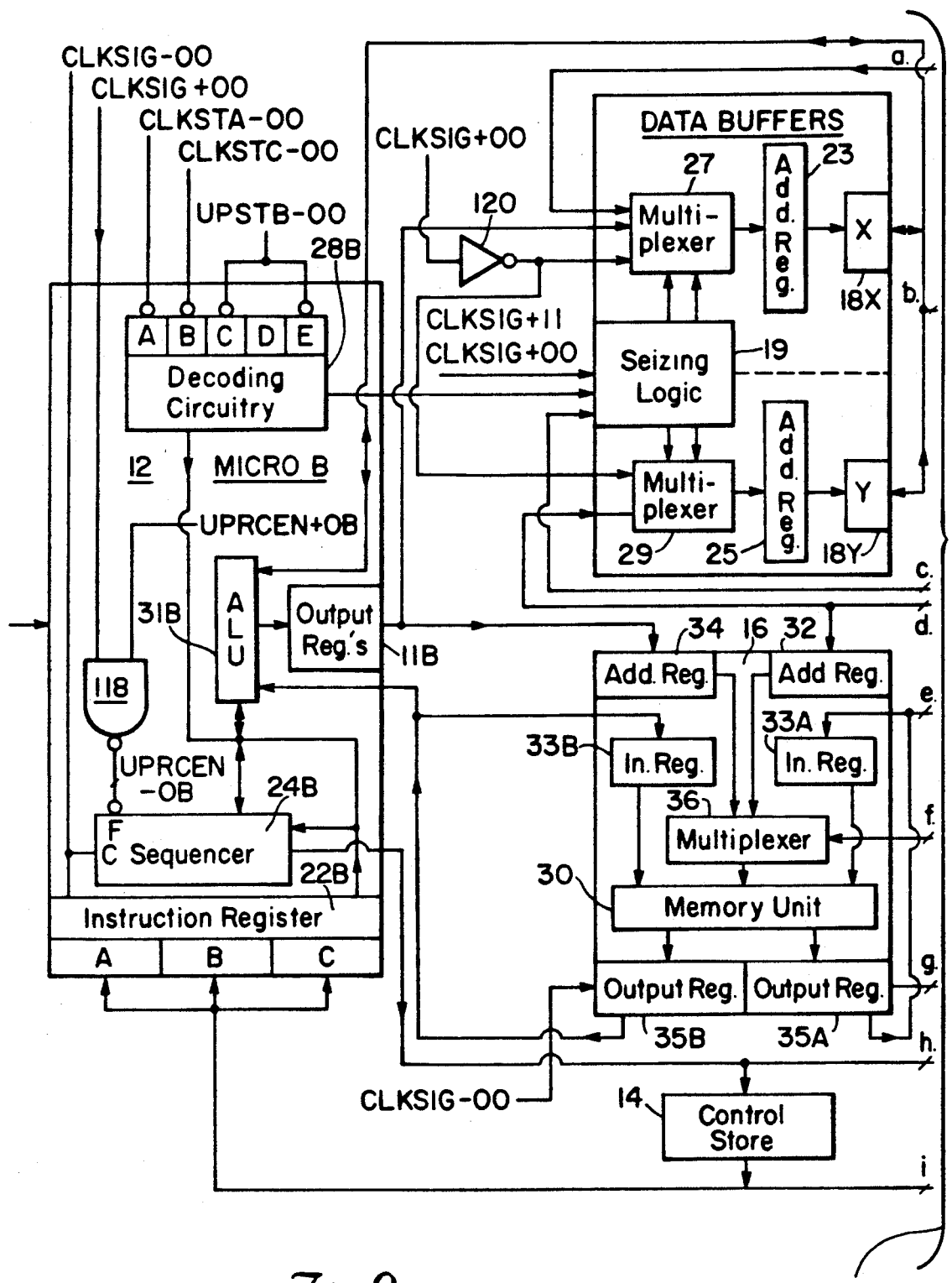
FIG. 2 shows in greater detail portions of the controller of FIG. 1.
Figure 2:
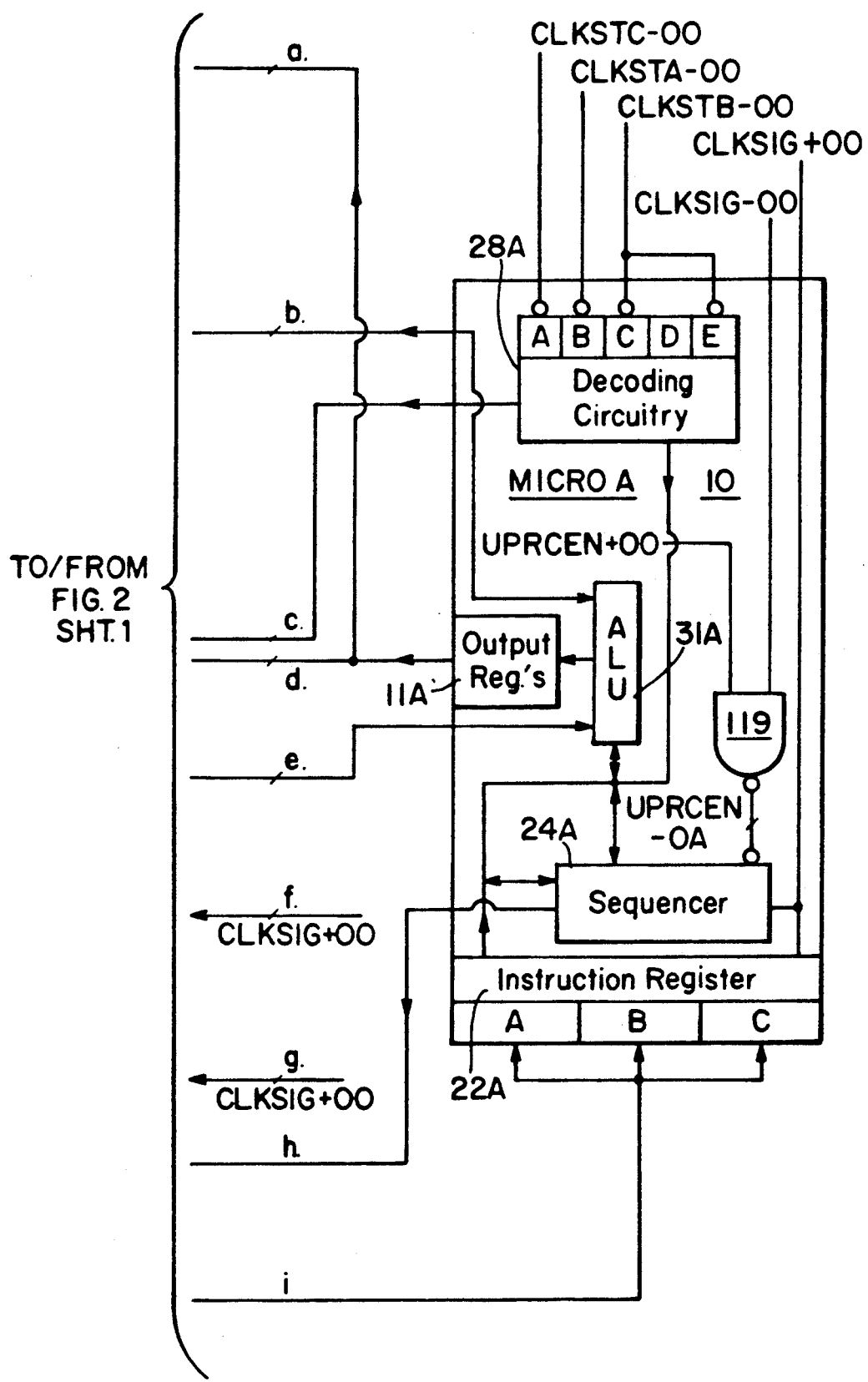

The elements of microprocessor A, are shown in more detail in FIG. 2. These elements include an instruction register 22A for receiving incoming microinstructions from the control store 14 and decoding circuitry 28A for decoding the incoming microinstructions Decoder units such as Texas Instruments 74S138 and 74S139 are used. There is, likewise, within microprocessor A a sequencer 24A. In the preferred embodiment, the sequencer 24A is an Advanced Micro Device AMD2910A. The sequencer 24A controls the sequence of execution of microinstructions. Also included within microprocessor is an ALU unit 31A for performing calculations as dictated by the incoming microinstructions. The ALU unit 31A has output registers 11A for storing its output until the output is needed. Microprocessor B is similarly comprised of like elements referenced by the suffix B as can be seen in FIG. 2.

Figure 3:
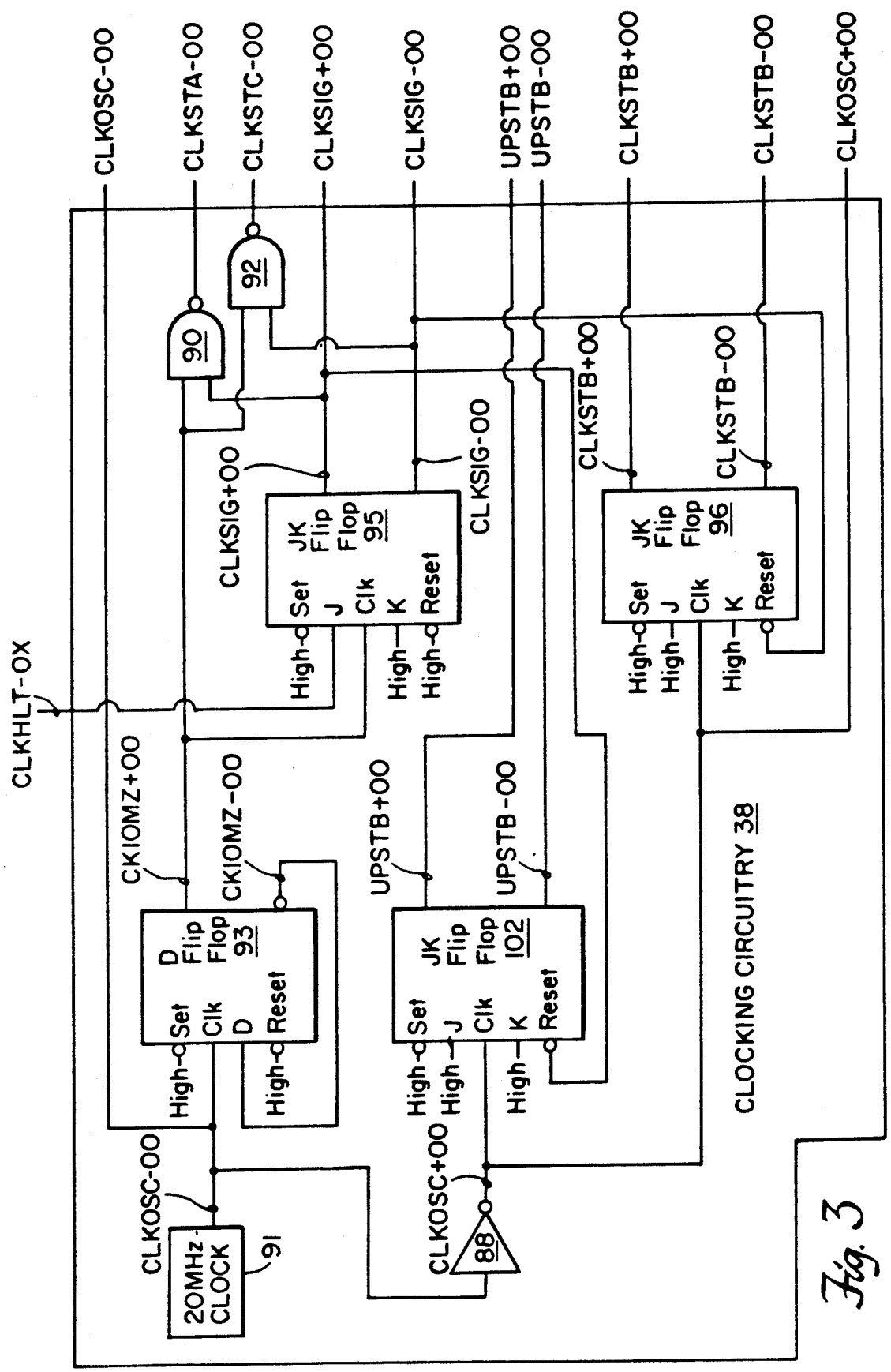
FIG. 3 shows in greater detail the clocking circuitry of the controller of FIG. 1.
Figure 5:
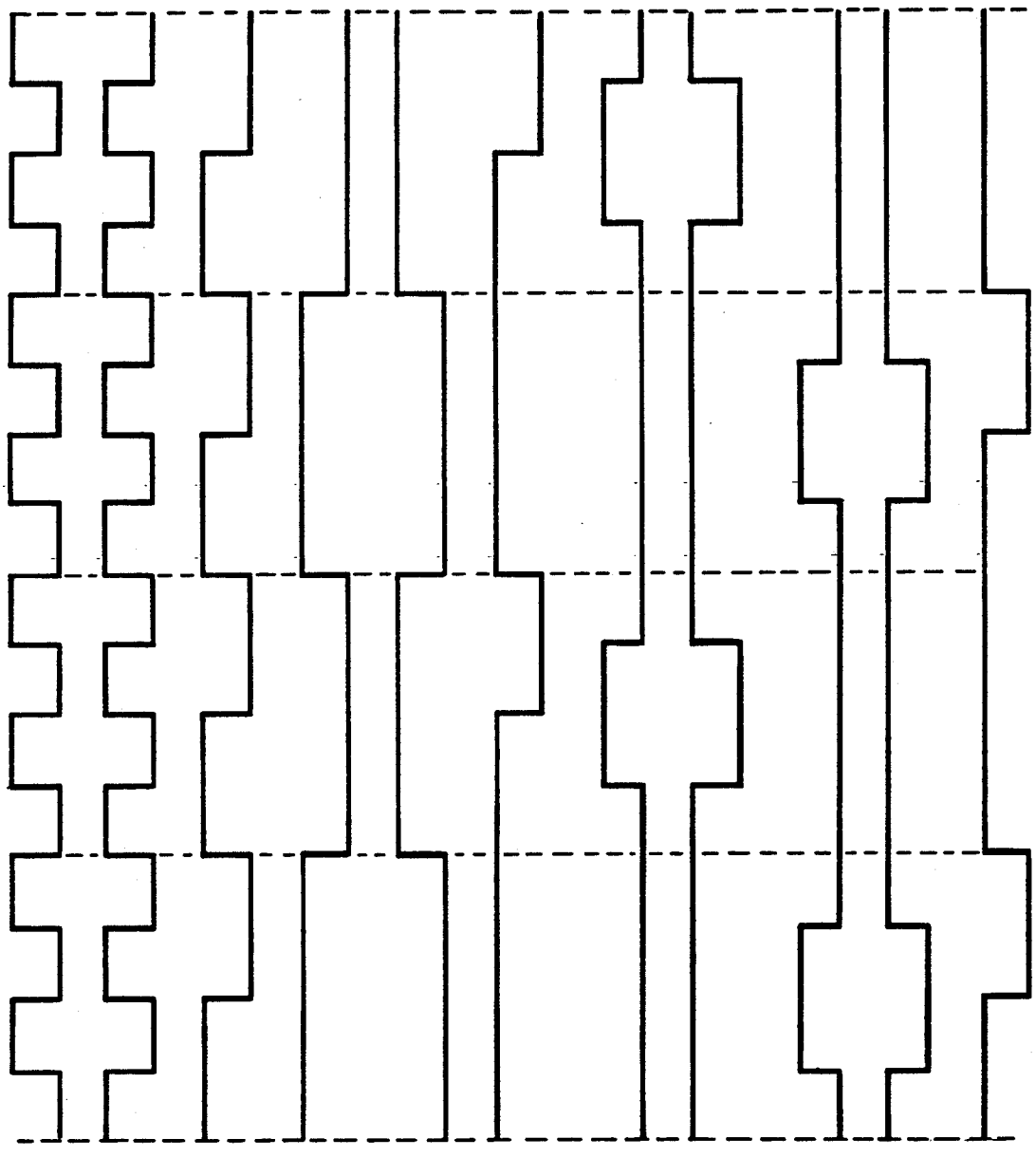
FIG. 5 shows the clock signals generated by the clocking circuitry and timing of operations of the microprocessors.

FIG. 3 shows the primary elements of the clocking circuitry 38, and specific clock signals from that circuitry are illustrated in FIG. 5. The clocking circuitry contains a 20 megahertz clock 91. The output from this clock 91 is the clock signal CLKOSC−00. CLKOSC−00 feeds into an inverter 88 and a D flip-flop 93. It also is used by other components of the controller 9.

CLKOSC−00 feeds into the clock signal of the D flip-flop 93. Both the set and reset inputs of the flip-flop 93 are tied high. The set and reset inputs are low active, so the flop is not set or reset during typical operation. The D input is the complemented output of the flip-flop 93, CK10MZ−00. The noncomplemented output is CK10MZ+00.

As mentioned above CLKOSC−00 also goes to an inverter 88. The output from this inverter 88 is CLKOSC+00.

The CK10MZ+00 output from the D flip-flop 93 feeds into another flip-flop 95. This flip-flop 95 is of the JK type. The CK10MZ+00 signal is complemented and used as a clock signal by the JK flip-flop 95. The set and reset inputs, which are low active, are tied high. The K input is likewise tied high. The J input is the signal CLKHLT−0X. CLKHLT−0X is generated and used only when in test mode. This signal is used to halt clock operation and is not used during normal operation. This flip-flop provides two outputs: CLKSIG+00 and its complement CLKSIG−00. These two signals are the basic timing signals used by the controller.

In addition to feeding into the JK flip-flop 95, the CK10MZ+00 signal feeds into two NAND gates, 90 and 92. In the first NAND gate 90, CK10MZ+00 is NANDed with CLKSIG+00. The resulting output is CLKSTA−00 which is used by other components in the controller. In the other NAND gate 92, CLKSIG−00 is NANDed with CK10MZ+00 to produce CLKSTC−00 which is, likewise, used by other elements of the controller.

The complement of the signal CLKOSC+00, acts as the clock input for two JK flip-flops, 96 and 102. The JK flip-flop 96 has its J,K and set inputs all tied high. Its reset input is CLKSIG−00. This JK flip-flop 96 produces two outputs which are used elsewhere in the controller: CLKSTB+00 and its complement CLKSTB−00. The other JK flip-flop 102 in which CLKOSC+00 serves as the clock signal also has its J,K and set inputs tied high. The reset input, however, is different. It is the signal CLKSIG+00. The two outputs from this JK flip-flop are UPSTB+00 and UPSTB−00.

The signals discussed above are all shown relative to each other in FIG. 5. Their role in controlling operation of the controller will be discussed in more detail below.

Figure 4:
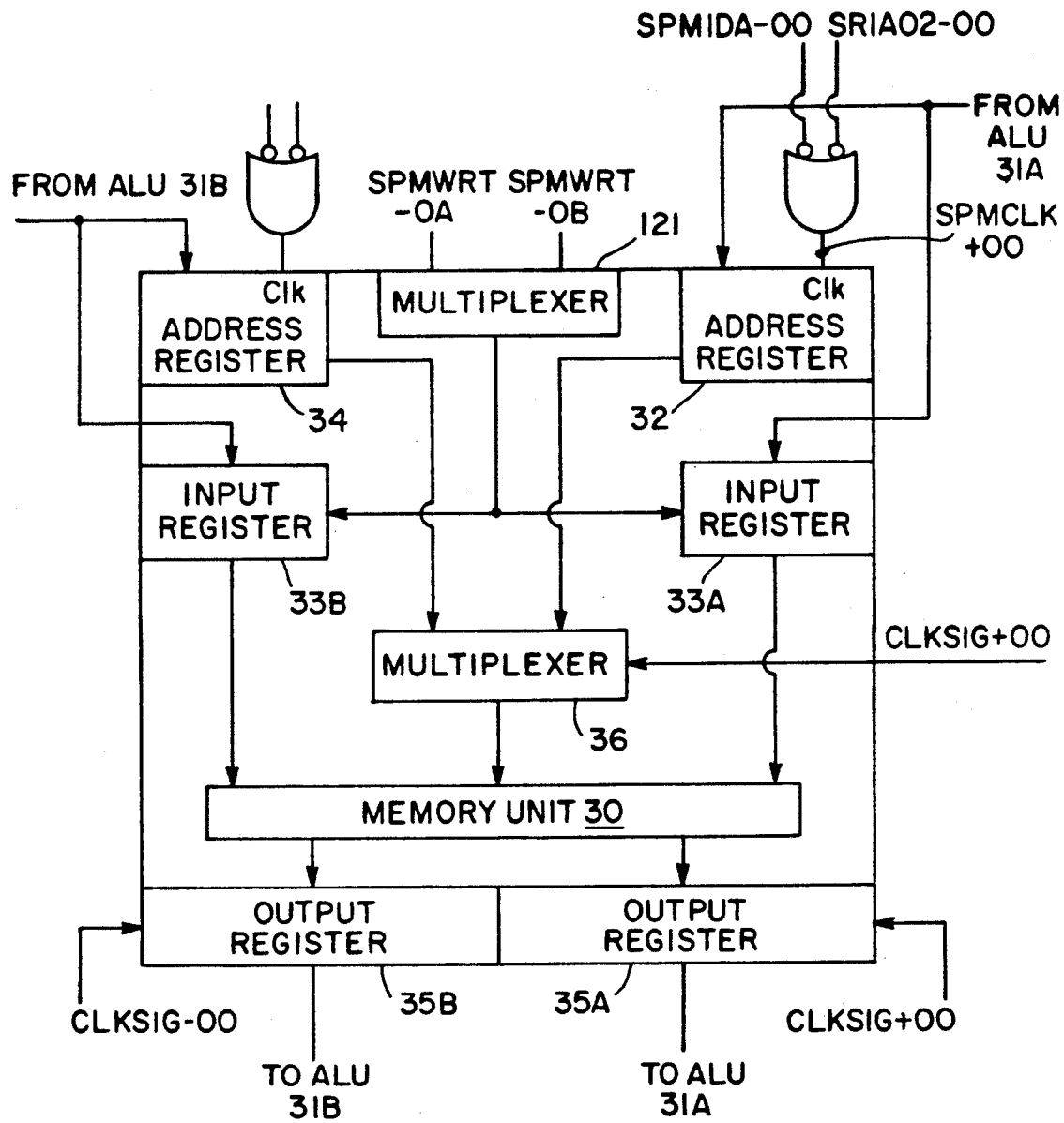
FIG. 4 shows in greater detail the memory used for interprocessor communication.

FIG. 4 shows the major elements of scratch pad memory 16. The foremost element is the memory unit 30. Other elements include two address registers 32, 34 which store addresses received from the ALUs 31A and 31B of the respective microprocessors 10 and 12. The address registers 32 and 34 work in conjunction with a multiplexer 36. The multiplexer 36 selects an address from one of the address registers 32 and 34. The data inputs and data outputs to and from the memory unit 30 are stored in input registers 33A and 33B and output registers 35A and 35B respectively.

The control store 14 contains sets of microinstructions for controlling the operation of each microprocessor 10 and 12. When one of these microinstructions is read out of the control store 14, it is latched into one of the instruction registers 22A or 22B at a time discussed below. For illustrative purposes, suppose that it is clocked into instruction register 22A. Different bits of the microinstruction held by the instruction register 22 are passed to the decoding circuitry 28A, ALU 31A, and/or sequencer 24A. Fields of the microinstruction such as its opcode are decoded by the decoding circuitry 28A.

If the instruction requires an access to scratch pad memory 16, an address in scratch pad memory 16 is computed by the ALU 31A. The ALU 31A also must calculate an address if access to the data buffers 18X and 18Y is required. As previously mentioned, the sequencer 24A controls the order of execution of microinstructions by the microprocessor. It determines the address for the next microinstruction to be executed. After being processed by these components, the microinstruction's execution is complete, whereupon the next microinstruction's address held in the sequencer 24A is passed to the control store 14, and the whole cycle is repeated.

The above description of the operation of one of the microprocessors 10 and 12 views the microprocessor in isolation. Since both microprocessors 10 and 12 share the same control store 14 and scratch pad memory 16, the clocking circuitry synchronizes both so that each has sufficient access to these shared resources 14 and 16. The present invention allows for such shared access while eliminating the need for costly and inefficient hardware to prevent conflict between the microprocessors.

FIG. 5 shows the basic timing scheme utilized in the preferred embodiment of the present invention. For purposes of illustration, it is helpful to review how the clock signals shown in FIG. 5 are used during operation of the ontroller. A good starting point is point 55 at which a microinstruction is clocked into the instruction register 22A of microprocessor A. This is accomplished by using CLKSIG+00 as the clock signal to the instruction register 22A. As can be seen in FIG. 1, the microinstruction is clocked in at the leading edge of the high portion of CLKSIG+00. The instruction register 22A is actually composed of at least three registers 22AA, 22AB and AC (FIG. 2). Each of which holds a third of the microinstruction.

Immediately after being clocked into the instruction register 22A, the bits of the microinstruction travel to other elements of the microprocessor A. Hence, during the half of cycle CLKSIG+00 between points 55 and 62, execution of the microinstruction begins. Where the bits of the microinstruction held by the instruction registers 2AA, 22AB and 22AC travel is, as previously mentioned, determined by the field they represent. The bits travel to decoding cirouitry 28A, ALU 31A, and/or sequencer 24A.

Those bits travelling to the decoding circuitry A must wait until the decoding circuitry 28 is enabled before they are decoded. The decoding circuitry 28A is composed of several decoding units 28AA, 28AB, 28AC, 28AD and 28AE, each of which has a separate clock signal that enables it. Thus, when a microinstruction's bits are decoded during a oyole of CLKSIG+00 depends on the clock signal for the particular decoding unit it enters. The decoding unit 28AA that decodes instructions to seize or release the data buffer 18 has the complement of CLKSTC−00 as one of its enable inputs. As a result, that decoding unit 28AA can be enabled only during time period 63. Similarly, the decoding unit 28AB that decodes commands to write to the data buffer has the complement of CLKSTA−00 as one of its enable inputs. It can be enabled only during time period 64. Also limited to a time period in which it can be enabled is the decoding unit 28AC which decodes microinstruction to write to the scratch pad memory 16 by microprocessor A. One of its enable inputs is the complement of CLKSTB−00. It can only be enabled during time period 65. Decoding unit 28AE, likewise, has the complement CLKSTB−00 as one of its enable inputs.

As mentioned above, bits of the microinstruction enter not only the decoding circuitry 28A, but also the ALU 31A. These bits are used in calculations performed by the ALU 31A. The significance of the calculations depends on the microinstruction that has been clocked into the instruction register 22A. The output from the ALU 31A is stored in output registers 11A. These registers have a clock input which is the signal OCTISTB+00 (not shown). OC1STB+00 is the AND of the oomplement of CLKSTB−00 and the complement of OPCOD1−00. OPCOD1−00 is a signal produced by one of the decoding units 28AD.

There are four types of microinstructions: set/reset, ALU, test and branch, and branoh. The first two bits of the microinstruction tell which type of instruction the microinstruotion is. OPCOD1−00 is the output that indicates that the microinstruction is an ALU type microinstruction. OPCOD0−00 indicates a branch microinstruction; OPCOD2−00 indicates a test and branch microinstruction; and OPCOD3−00 indicates a set/reset instruction. They are low active. Thus, CLKSTB−00 must be low and OPCOD1−00 must be low for OCISTB+00 to be high.

Also mentioned above was that bits go to the sequencer 24A. The sequencer 24A, like the instruction register 22A uses CLKSIG+00 as its clock signal. At the rising edge of the CLKSIG+00 signal, fields from the ALU 31A and decoding circuitry 28A are clocked into sequencer 24A. The output, however, is not enabled until UPRCEN−0A is high. UPRCEN−0A is the output from the NAND gate 119 having inputs: CLKSIG−00 and UPRCEN+00 (a test ; signal which is tied high during normal operation). During normal operation UPRCEN-0A is dictated by CLKSIG−00. Thus, the fields are clocked into sequencer 24A at point 55. Microprocessor B has corresponding signals UPRCEN.OB and CLKSIG.00. UPRCEN+0B is tied high during normal operation. UPRCEN−0B is the output from the NAND gate 118 having inputs of CLKSIG+00 and UPRCEN+0B. The resulting output from sequencer 24A is not valid until point 62. This microinstruction data is clocked into the instruction register 22A at point 60.

The address generated by the sequencer 24A travels to the control store beginning at point 62. The address is used to retrieve a microinstruction from the control store 14 during the half cycle starting at point 62. The retrieved microinstruction is not clocked into the instruction register 22A until point 60. By point 60, execution of the previously fetched microinstruction is complete. At point 60, the cycle begins again for microprocessor A.

The above discussion illustrates the synchronization involved in the preferred embodiment. At point 62, mioroprocessor B has a mioroinstruction clocked into its instruction register 22B. It repeats the steps described above for microprocessor A, but microprocessor B operates a half of a cycle of CLKSIG+00 out of phase with the operation of microprocessor A. The differences in timing between the microprocessors can be seen by looking at the clock signals for each. To begin with, the clock signal to microprocessor B's instruction register is CLKSIG−00. Further, the decoding units utilize a different clocking scheme. The decoding units responsible for decoding microinstructions that require soratch pad access, 28BC and 28BE, have the complement of UPSTB−00 as their clock signal. The decoding circuitry unit 28BA that decodes microinstructions to release or seize the data buffers 8X and 18Y has the oomplement of CLKSTA−00 as its clock signal. Moreover, decoder unit 28BB which decodes instructions to write to the data buffer has the complement of CLKSTC−00 as its clock input.

As a result of these clock signals, the data buffer may only be seized or released by microprocessor B during time period 67 for the cycle of CLKSIG−00 between points 58 and 62. Similarly, writes to scratch pad memory by mioroprocessor B are limited to time period 66 and writes to the data buffer are limited to time period 68. This synchronization scheme allows both microprocessors 10 and 12 to efficiently share scratch pad memory 16, the control store 14, and data buffers 18X and 18Y without conflict.

The sequencers 24A and 24B of each microprocessor 10 and 12 also rely on different clock signals. CLKSIG+00 is the clock signal for sequencer 24A as already mentioned, whereas CLKSIG−00 is the clock signal for sequencer 24B. Moreover, sequencer 24A relies on CLKSIG−00 as its output enable. Sequencer 24B, on the other hand, relies on CLKSIG+00 as its output enable.

Having examined where the fields of a microinstruction travel upon entering the instruction register 22A, it is necessary to look further at the outputs from the decoding circuitry 28A. If a microinstruction requiring a data buffer to be seized or released is decoded, the appropriate output from the decoding unit is forwarded to the seizing logic 19 implemented in Programmable Array Logic (PAL). In the preferred embodiment, PAL20R4A and PAL 20L8A ohips are used. The seizing logic 19 determines whether a data buffer is seized by one of the microprocessors 10 and 12. The PAL 19 is connected to multiplexers 27 and 29. These multiplexers are used to select an address from the address registers 23 and 25. They are clocked by a signal CLKSIG+11 which is obtained by complementing CLKSIG+00 through an inverter 120. The data buffers 18X and 18Y, however, are not the central focus of the present invention. Thus, a more detailed description of the data buffers and seizing logic is presented in the related application Peripheral Controller with Paged Data Buffer Management.

If the microinstruction decoded by the decoding circuitry 28A seeks access to scratch pad memory 16, the appropriate signals from the decoder circuitry 28A are sent to the scratch pad memory 16. Two signals are especially of interest: SPMIDA−00 and SRIA02−00. The SPMIDA−00 comes from the decoding unit 28AC and indicates that an instruction to increment the address held in the scratch pad indioates that the scratch pad address register 32 is to be loaded with the AOP field of the microinstruction. The AOP field consists of the seventh through tenth bits of the mioroinstruotion. These two singals are of special interest because their complements are ORed resulting in SPMCLK+00.

SPMCLK+00 is used as the clock input into the address register 32.

The address to be accessed in the scratch pad memory 16 is calculated by the ALU 31A. The calculated address is clocked into the scratch pad address register 32 at the leading edge of the high portion of the SPMCLK+00. The address, however, will not be used until the multiplexer 36 selects that address register 32. Which address register it selects depends on the state of CLKSIG+00. If CLKSIG+00 is high, the multiplexer will select address register 32. On the other hand, if CLKSIG+00 is low, address register 34 will be selected. Thus, the multiplexer 36 does not select until the half cycle following the half oycle in which the address is loaded into the address registers 32 and 34. For instance, the address register 32 would receive an address during the half cycle between 62 and 60. The memory location within the memory unit 30 represented by the address cannot, however, be accessed until the half cycle immediately following 60. Once selected, the address in the address reqister is used to access the memory unit 30.

All input for the memory unit 30 is stored in input registers 33A and 33B. Register 33A stores input from microprocessor A and 33B stores input from microprocessor B. The input registers 33A and 33B have clock signals that are always tied high. Hence, their synchronization is controlled by their output enable. Their output is enabled by the complement of SPMWEN−0A and the oomplement of SPMWEN−0B signals respectively. SPMWEN−0A and SPMWEN−0B are derived from the multiplexer 121. If CLKSIG+00 is high and SPMWRT−0A is high, then SPMWEN−0A is low and enables the output from input register 33A. Similarly, if CLKSIG−00 is low and SPMWRT−0B is high, SPMWEN−0B is low and enables the output from input register 33B. Output is stored in the output registers 35A and 35B. 35A stores output for microprocessor A and 35B stores output for microprocessor B. Output register 35A has CLKSIG.00 as its clock signal and output régister 35B has CLKSIG−00 as its clock signal. The two output registers 35A and 35B are, thus, half a cycle out of phase.

The above discussion has focused on microprocessor A for illustrative purposes. It should be noted that operation of microprocessor B is similar. The difference between the two microprocessors 10 and 12 rests with the timing signals that govern their operation. In most instances, for every signal mentioned in the disoussion of microprooessor A there is a corresponding signal for microprocessor B. The major corresponding signals have been discussed above.

The above description of the timing was for illustrative purposes. Microprocessor A and microprocessor B could be synchronized opposite the described scheme (i.e., microprocessor A and microprocessor B could swap times when they perform given tasks). Further, if more than two microprocessors were used, the timing would have to be altered. For example, if three microprocessors were used, a cycle could be divided into three portions with each component performing operations during the respective portion time periods. These variations are encompassed Within the present invention.

Figure 7:
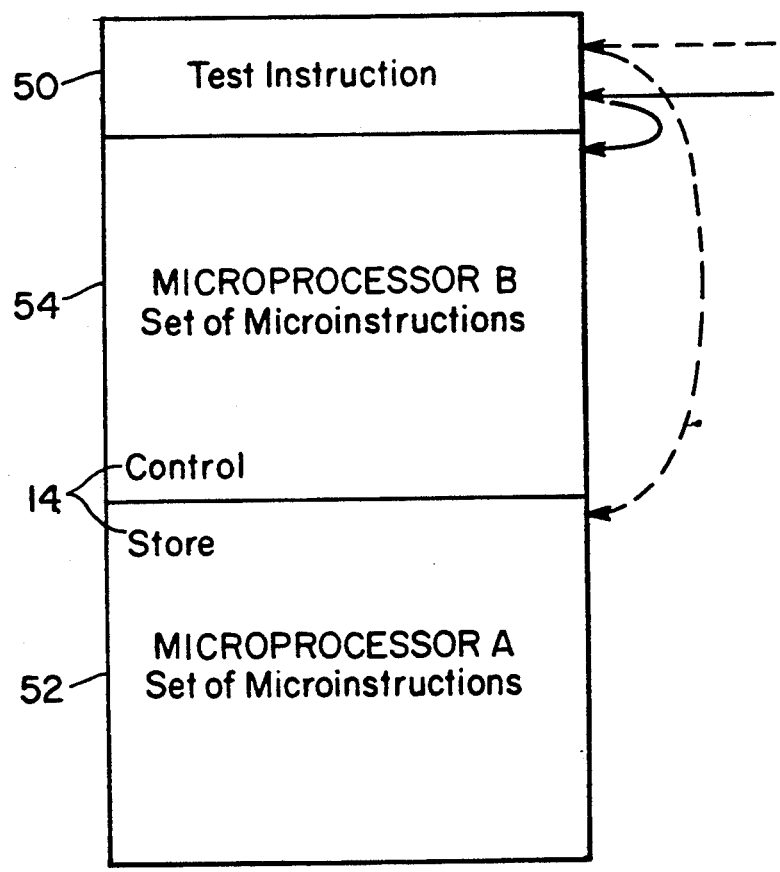
FIG. 7 shows the organization of the control store and is used in explaining the initialization sequence.

In order to utilize the control store 14 of the present invention, it must first be prepared for operation. Preparation involves loading a test microinstruction into an initial location 50 (See FIG. 7) in the control store 14. Also loaded into the control store 14 are sets of microinstructions 52 and 54 for each microprocessor 10 and 12 respectively. They may be organized as shown in FIG. 7 or in other ways if desired. When the microprocessors 10 and 12 begin operation, they are directed to an initial location 50 where the test microinstruction is stored.

The test mioroinstruction comprises a test and branch type microinstruction. The test microinstruction tests the identity of the microprocessor that executes it. The test microinstruction knows the identity of one of the microprocessors. Suppose, for example, that it knows the identity of microprocessor A. It compares the identity of the microprocessors executing it with the known identity. If the identity matches the known identity, a branch occurs. Hence, microprocessor A, whose identity matches the known identity, branches to the beginning of its set of microinstructions 52 when executing the test microinstruction. On the other hand, when microprocessor B executes the test microinstruction, the identities would not match so it would not branch. The next microinstruotion in sequential order, which is the beginning of microprocessor B's set of microinstructions 54, would be fetched.

Figure 6:
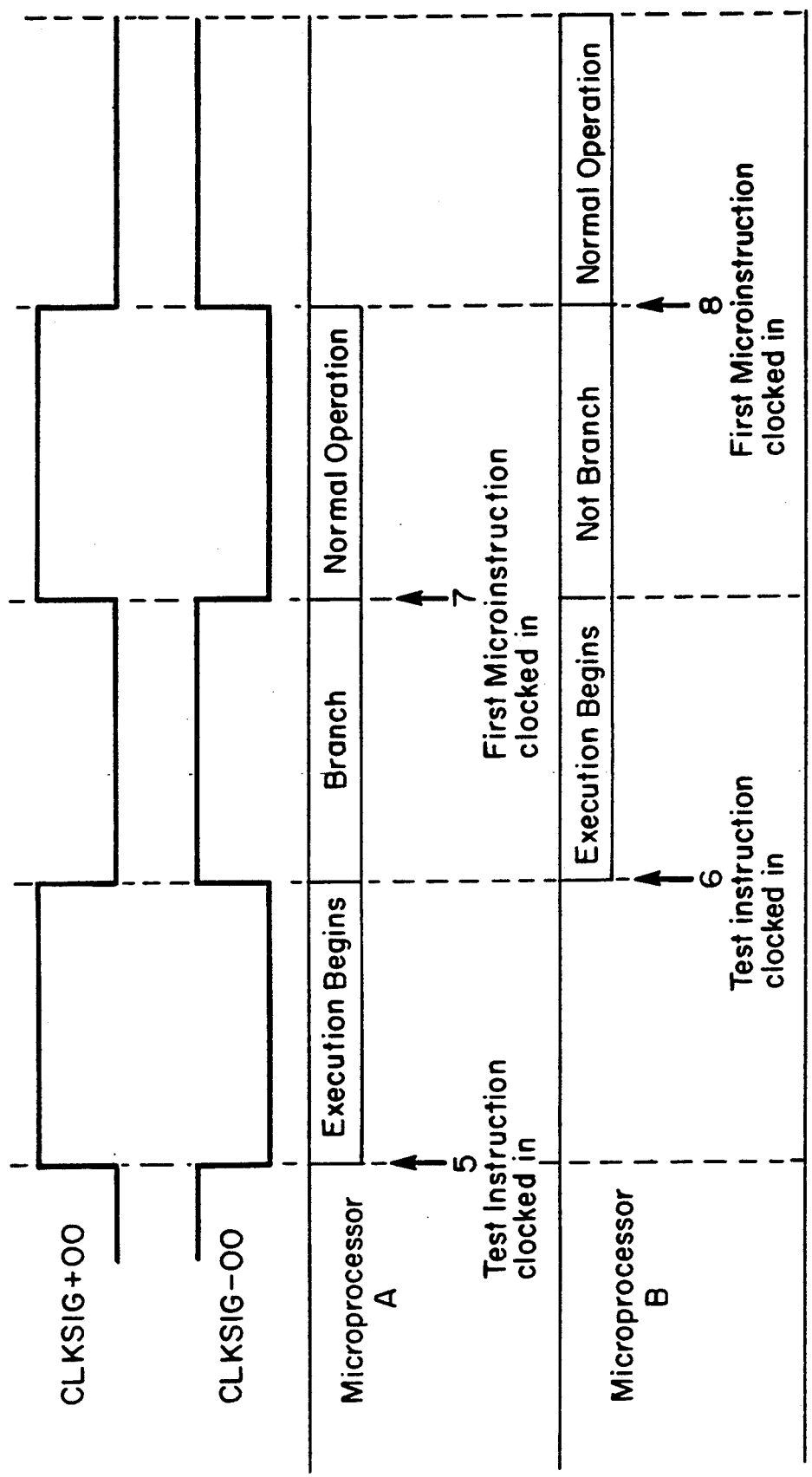
FIG. 6 is a timing diagram used to explain the initialization sequence.

The timing of this process is shown in FIG. 6. At point 5, the test instruction would be clocked into microprocessor A. During the half of a cycle immediately following point 5, execution would begin on the test instruction. At point 6, the test microinstruction would be clocked into microprocessor B. During the half of a cycle immediately following point 6, microprocessor A would branch. Microprocessor B would begin executing the test instruction. At point 7, the first microinstruction of the set of microinstructions 52 for microprocessor A would be clocked into microprocessor A. Processing for microprocessor A would then be as previously described. Microprocessor B would complete execution of the test instruction during the half of a cycle immediately following point 7 and load in the first of its set of microinstruotions 54 at point 8. After point 8, processing for microprooessor B would be as previously described.

The present invention offers several advantages which improve system performance over the prior art. First, it does not require expensive and burdensome hardware to synohronize the microprocessors. Second, it is more efficient than the prior art because it shares data buffers, scratch pad memory, and a control store. There is no need for separate data buffers, scratch pad memories, and, in particular, control stores for each microprocessor. Third, because of the synchronization, pseudo or apparently simultaneous read/write capability is provided. These are just a few of the advantages. It should be understood that this list of advantages is not exhaustive.

While the invention has been particularly shown and described with reference to a preferred embodiment thereof, it will be understood by those skilled in the art that various changes in form and details may be made therein without departing from the spirit and scope of the invention as defined in the appended claims.

We claim:

1. A controller for controlling data transfers between a data processing system bus and peripheral devices, comprising:
    a. at least one data buffer for temporarily storing data as it passes between the data processing system bus and the peripheral devices;
    b. a first microprocessor for controlling data transfers between the data processing system bus and the at least one data buffer;
    c. a second microprocessor in communication with the first microprocessor for controlling data transfers between the data buffer and the peripheral devices;
    d. a control store connected to both microprocessors for storing microinstructions that control operation of the respective microprocessors; and
    e. a timing means which produces a clock signal divided into cycles wherein each microprocessor is assigned a portion of a cycle during which it may exclusively access the control store.

2. A controller as recited in claim 1 further comprising a scratch pad memory connected to both microprocessors.

3. A controller as recited in claim 2 wherein each microprocessor is assigned a portion of a cycle in which it may exclusively access the scratch pad memory or exclusively seize the data buffer.

4. A controller as recited in claim 1 wherein the dual port control store comprises a random access memory.

5. A controller as recited in claim 1 wherein there are two data buffers.

6. A controller as reoited in claim 1 wherein the control store is loaded with separate sets of microinstructions for each microprocessor.

7. A controller as recited in claim 1 wherein the control store is prepared for operation by loading it with a test instruction which directs each microprocessor to the beginning of its respective set of microinstructions.

8. A controller as reoited in claim 7 wherein the test instruction is a conditional branch instruction.

9. A peripheral device controller for controlling data transfers between a data processing system bus and peripheral devices, comprising:
    a. at least one data buffer for temporarily storing data as it passes between the data processing system bus and the peripheral devices;
    b. a first microprocessor for controlling data transfers between a data processing system bus and peripheral devices, comprising:
    a. at least one data buffer for temporarily storing data as it passes between the data processing system bus and the peripheral devices;
    b. a first microprocessor for controlling data transfers between the at least one data buffer and the data processing system bus;
    c. a second microprocessor for controlling data transfers between the at least one data buffer and the peripheral devices;
    d. a control store comprising a random access memory for storing sets of microinstructions for each microprocessor wherein the control store is prepared for operation by loading it with a test instruction which directs each of the microprocessors to the beginning of its respective set of microinstructions; and
    e. a timing means which generates a clock signal which is divided into cycles wherein each microprocessor is assigned a portion of a cycle during which it may exclusively access the control store.

10. A controller for efficiently transferring information between peripheral devices and a system bus comprising
    a. a first synchronously operated processor for receiving and processing input/output commands from said system by specifying operation to be performed by said bus;
    b. a second synchronously operated processor for transferring information to the peripheral devices;
    c. a control store coupled to said first and second processor comprising a first and a second set of storage locations for storing sets of a corresponding number of microinstructions for each said processor wherein said microinstructions define operations to be performed by said processors;
    d. a timing means for application to said first and second processors for synchronizing their operations relative to each other in a predetermined manner, each sequence having at least first and second intervals for defining the time period that said first and second processors respectively have exclusive access to said control store; and e. at least one data buffer for temporarily storing data as it passes between the data processing system bus and the peripheral devices.

11. A method of synchronizing elements of a controller having a buffer, first and second microprocessors, a timing means and a control store which controls data transfers between a data processing system bus and peripheral devices, comprising:

(a) dividing time into cycles using the timing means;

(b) at the start of a first portion of a cycle, performing an instruction fetch by the first microprocessor from the control store;

(c) during said first portion of said cycle, beginning execution by the first microprocessor of the microinstruction fetched by he first microprocessor; and completing execution by the second microprocessor of a microinstruction previously fetched by the second microprocessor;

(d) at the start of a second portion of said cycle, performing an instruction fetch by the second microprocessor from the control store;

(e) during said second portion of said cycle, p1 beginning execution by the second microprocessor of the microinstruction fetched by the second microprocessor; and (f) repeating the above steps b through e.

12. A method of synchronizing elements of a controller as recited in claim 11 wherein execution of the microprocessor may comprise exclusively accessing a scratch pad memory or exclusively seizing a data buffer.

13. A method of synchronizing elements of a controller as recited in claim 11 wherein each said microprocessor may only exclusively access the scratch pad memory or exclusively seize a data buffer during an assigned one of said portions of cycles which is not assigned to other said microprocessors, and the assigned one of said portions is the same for each cycle.

14. A method of preparing a control store of a controller having a data buffer, first and second microprocessors, and a timing means for operation comprising:

(a) loading a test instruction into the control store;

(b) loading a set of microinstructions for each microprocessor into the control store;

(c) dividing time into cycles using the timing means;

(d) at the start of a first portion of a cycle, fetching the test instruction from the control store by the first microprocessor;

(e) during said first portion of said cycle, beginning execution of the test instruction by the first microprocessor;

(f) at the start of a second portion of said cycle, fetching the test instruction by the second microprocessor;

(g) during said second portion of said cycle, completing execution of the test instruction by the first microprocessor wherein execution of the test instruction comprises directing the first microprocessor to a first microinstruction in its set of microinstructions;

beginning execution of the test instruction by the second microprocessor;

(h) at the start of a first portion of a next cycle, fetching the first microinstruction at the beginning of the set of microinstructions for the first microprocessor by he first microprocessor;

(i) during said first portion of said next cycle, completing execution of the test instruction by the second microprocessor comprises directing the second microprocessor of a first microinstruction in its set of microinstructions;

(j) fetching the first microinstruction in the set of microinstructions for the second microprocessor by the second microprocessor.

* * * * *